United States Patent
Lee

(10) Patent No.: US 12,241,973 B2
(45) Date of Patent: Mar. 4, 2025

(54) METHOD AND SYSTEM FOR DETECTING VELOCITY OF TARGET

(71) Applicant: HYUNDAI MOBIS CO., LTD., Seoul (KR)

(72) Inventor: Dong Hee Lee, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 331 days.

(21) Appl. No.: 17/675,360

(22) Filed: Feb. 18, 2022

(65) Prior Publication Data

US 2022/0260710 A1    Aug. 18, 2022

(30) Foreign Application Priority Data

Feb. 18, 2021 (KR) .......... 10-2021-0021890
Mar. 5, 2021 (KR) .......... 10-2021-0029389

(51) Int. Cl.

| | | |
|---|---|---|
| *G01S 13/931* | (2020.01) | |
| *G01S 13/58* | (2006.01) | |
| *G01S 13/66* | (2006.01) | |
| *G01S 13/86* | (2006.01) | |
| *G01S 17/58* | (2006.01) | |
| *G01S 17/931* | (2020.01) | |

(52) U.S. Cl.
CPC .......... *G01S 13/931* (2013.01); *G01S 13/589* (2013.01); *G01S 13/66* (2013.01); *G01S 13/865* (2013.01); *G01S 13/867* (2013.01); *G01S 17/58* (2013.01); *G01S 17/931* (2020.01); *G01S 2013/9323* (2020.01); *G01S 2013/9324* (2020.01)

(58) Field of Classification Search
CPC .......... G01S 13/931; G01S 13/66–726; G01S 13/865; G01S 13/867; G01S 17/931; G01S 2013/9323; G01S 2013/9324; G01S 13/42; G01S 13/862; G01S 13/589; G01S 17/58

See application file for complete search history.

(56) References Cited

U.S. PATENT DOCUMENTS

| | | | |
|---|---|---|---|
| 2011/0175767 A1* | 7/2011 | Tsunekawa | ............ G08G 1/166 |
| | | | 342/107 |
| 2016/0133063 A1 | 5/2016 | Lim et al. | |
| 2017/0248693 A1* | 8/2017 | Kim | ............ G01S 13/865 |
| 2019/0228322 A1 | 7/2019 | Wenner et al. | |
| 2021/0003687 A1* | 1/2021 | Nishida | ............ G01S 13/58 |

FOREIGN PATENT DOCUMENTS

| | | |
|---|---|---|
| CN | 108469802 A | 8/2018 |
| CN | 109474671 A | 3/2019 |
| CN | 113902233 A | 1/2022 |
| KR | 10-2020-0095703 A | 8/2020 |

OTHER PUBLICATIONS

Extended European search report issued on Aug. 22, 2023, in counterpart European Patent Application No. 22211292.2 (8 pages).

* cited by examiner

*Primary Examiner* — Matthew M Barker
(74) *Attorney, Agent, or Firm* — NSIP Law

(57) ABSTRACT

A method and system to accurately detect a longitudinal velocity of a target by using longitudinal and lateral velocity values calculated by grouping a plurality of Doppler velocities detected from the target by a detection sensor mounted in a vehicle on the basis of the plurality of Doppler velocities.

20 Claims, 6 Drawing Sheets

METHOD AND SYSTEM FOR DETECTING VELOCITY OF TARGET

CROSS REFERENCE TO RELATED APPLICATION

This application claims the benefit under 35 USC 119(a) of Korean Patent Application No. 10-2021-0021890, filed Feb. 18, 2021 and Korean Patent Application No. 10-2021-0029389, filed Mar. 5, 2021, the entire disclosures of which are incorporated herein by reference for all purposes.

BACKGROUND

Field

The present disclosure relates to a radar device for a vehicle and a target measurement method thereof, and more particularly, to a technology for detecting a longitudinal velocity of a target on the basis of a Doppler velocity of the target.

Description of Related Art

A radar device mounted in a vehicle or the like is widely used as a sensor device for controlling the vehicle. The radar device serves to transmit electromagnetic waves having a predetermined frequency, receive signals reflected by an object, and process the received signals, thereby extracting information on a position or velocity of the object.

The radar device used to control the vehicle needs to have high angle resolution. Further, the radar device needs to have a mid/long-range detection function of detecting a distant object within a comparatively narrow angle range by using a single antenna assembly and a short-range detection function of detecting a near-distance object within a comparatively wide angle range.

Meanwhile, in the case of a typical radar sensor device for a vehicle, a transmission beam for mid/long-range detection needs to have a sharp long-range beam pattern so that the transmission beam reaches a distant location while having a narrow detection region, and a transmission beam for short-range detection needs to have a short-range beam pattern that covers a wide detection region.

In the related art, to differently define the long-range beam pattern and the short-range beam pattern, a radar sensor device generally has a mid/long-range transmission antenna (Tx_LR) and a short-range transmission antenna (Tx_SR) that are distinguished from each other.

A controller of a radar sensor performs a mid/long-range detection mode and a short-range detection mode in a time-division manner. In the mid/long-range detection mode, the controller transmits the long-range beam pattern through the mid/long-range transmission antenna (Tx_LR), and receives and processes a reflected signal reflected by a long-distance target, thereby acquiring information (position, distance, angle, velocity, and the like) of the long-distance target.

In addition, in the short-range detection mode, the controller transmits the short-range beam pattern through the short-range transmission antenna (Tx_SR), and receives and processes a reflected signal reflected by a short-distance target, thereby acquiring information (position, distance, angle, velocity, and the like) of the short-distance target.

A method of detecting a velocity of a target in the related art estimates a velocity on the basis of information on positions of detection points of the target received from the radar sensor. However, there is a problem in that a large error occurs on an initial velocity value because of position ambiguity because of an angle detection error or a volume of the target.

The foregoing explained as the background is intended merely to aid in the understanding of the background of the present disclosure, and is not intended to mean that the present disclosure falls within the purview of the related art that is already known to those skilled in the art.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of detecting a velocity of a target for a vehicle, the method includes calculating, by a tracking filter in a first calculation operation, a first longitudinal velocity at a detection point of a target detected by a detection sensor of a vehicle; computing, in a computation operation, longitudinal computation velocities at a plurality of detection points when the plurality of detection points is detected; grouping, in a grouping operation, the longitudinal computation velocities; calculating, in a second calculation operation, a second longitudinal velocity of the target based on the longitudinal computation velocities of a group of the grouping including a largest number of detection points; and calculating, in a final calculation operation, a final longitudinal velocity of the target by using the first and second longitudinal velocities.

The method may further include calculating, by the tracking filter and detection information on the detection points in a heading angle calculation operation, heading angles at the plurality of detection points when the plurality of detection points is detected. The first calculation operation may be performed to further calculate, by the tracking filter, a first lateral velocity at the detection point of the target detected by the detection sensor. The computation operation may be performed to compute longitudinal and lateral computation velocities at the detection points based on the calculated heading angles. The grouping operation may be performed to group the plurality of longitudinal and lateral computation velocities. The second calculation operation may be performed to calculate the second longitudinal velocity and a second lateral velocity of the target based on the longitudinal and lateral computation velocities of the group including the largest number of detection points. The final calculation operation may be performed to calculate a final velocity of the target by using the first and second longitudinal velocities.

The method may further include calculating, in a track calculation operation, a track of the target when the plurality of detection points of the target detected by the detection sensor is detected within a preset range before the first calculation operation. The first calculation operation may be performed to calculate the first longitudinal velocity and the first lateral velocity of the target using the tracking filter by using the detection point detected in the track.

The computation operation may be performed to calculate the longitudinal and lateral computation velocities at the plurality of detection points detected in the track.

The computation operation may be performed to compute the longitudinal computation velocity and a lateral computation velocity of the target using a preset computation formula based on a Doppler velocity at a target point.

The grouping operation may be performed to define a plurality of groups in which the longitudinal and lateral computation velocities are defined within a preset range based on the plurality of longitudinal and lateral computation velocities computed in the computation operation. The second calculation operation may be performed to calculate the second longitudinal velocity and the second lateral velocity based on a mean value of the computation velocities included in the group including the largest number of computation velocities among the plurality of groups.

The method may further include determining the number of detection points in a determination operation. The computation operation may be performed when it is determined that the number of detection points is equal to or larger than a preset number in the determination operation. The first calculation operation may be performed when it is determined that the number of detection points is smaller than the preset number in the determination operation.

The final calculation operation may be performed to set a weight value as a value determined by dividing the number of detection points used in the second calculation operation by the total number of detection points and calculate the final longitudinal velocity by using the weight value and the first and second longitudinal velocities.

The final calculation operation may be performed to calculate the final longitudinal velocity by summing up a first longitudinal value determined by multiplying the first longitudinal velocity by a value determined by subtracting the weight value from 1. A second longitudinal value determined by multiplying the second longitudinal velocity by the weight value.

The heading angle calculation operation may be performed to calculate the heading angle of the target based on detection information of the target detected by any one or any combination of any two or more of a lidar sensor, a camera sensor, and an ultrasonic sensor disposed in the vehicle and detection information of the target detected by a radar sensor.

The heading angle of the target may be calculated by providing a weight value to the detection information based on detection levels of any one or any combination of any two or more of the lidar sensor, the camera sensor, and the ultrasonic sensor and a detection level of the radar sensor.

The final calculation operation may be performed to set a weight value as a value determined by dividing the number of detection points used in the second calculation operation by the total number of detection points, calculate the final longitudinal velocity by using the weight value and the first and second longitudinal velocities, and calculate the final lateral velocity by using the weight value and the first and second lateral velocities.

The final calculation operation may be performed to calculate the final longitudinal velocity by summing up a first longitudinal value determined by multiplying the first longitudinal velocity by a value determined by subtracting the weight value from 1, a second longitudinal value determined by multiplying the second longitudinal velocity by the weight value and calculating the final lateral velocity by summing up a first lateral value determined by multiplying the first lateral velocity by the value determined by subtracting the weight value from 1, and a second lateral value determined by multiplying the second lateral velocity by the weight value.

In another general aspect, a system for detecting a velocity of a target for a vehicle, the system includes a first calculator configured to calculate, by a tracking filter, a first longitudinal velocity and a first lateral velocity at a detection point of a target detected by a detection sensor of a vehicle; a heading angle calculator configured to calculate, by the tracking filter and detection information on the detection point, heading angles at a plurality of detection points when the plurality of detection points is detected; a computator configured to compute longitudinal and lateral computation velocities at the detection points based on the heading angles calculated by the heading angle calculator; a second calculator configured to group the plurality of longitudinal and lateral computation velocities and calculate a second longitudinal velocity and a second lateral velocity of the target based on the longitudinal and lateral computation velocities of a group including a largest number of detection points; and a final calculator configured to calculate a final longitudinal velocity of the target by using the first and second longitudinal velocities and calculate a final lateral velocity of the target by using the first and second lateral velocities.

The system may further include a track calculator configured to calculate a track of the target when the plurality of detection points of the target detected by the detection sensor may be detected within a preset range. The first calculator may be further configured to calculate the first longitudinal velocity and the first lateral velocity of the target using the tracking filter by using the detection point detected in the track.

The computator may be further configured to calculate the computation velocities at the plurality of detection points detected in the track calculated by the track calculator.

The computator may be further configured to calculate the longitudinal and lateral computation velocities at the plurality of detection points detected in the track calculated by the track calculator.

The system may further include a determiner configured to determine the number of detection points of the target detected by the detection sensor. The computator may be further configured to compute the longitudinal and lateral computation velocities at the detection points when the determiner determines that the number of detection points is equal to or larger than a preset number. The first calculator may be further configured to calculate the first longitudinal velocity and the first lateral velocity when the determiner determines that the number of detection points is smaller than the preset number.

The final calculator may be further configured to calculate a weight value based on the number of detection points computed by the second calculator and the total number of detection points, calculate the final longitudinal velocity by using the weight value and the first and second longitudinal velocities, and calculate the final lateral velocity by using the weight value and the first and second lateral velocities.

Other features and aspects will be apparent from the following detailed description, the drawings, and the claims.

DETAILED DESCRIPTION

Figure 1:
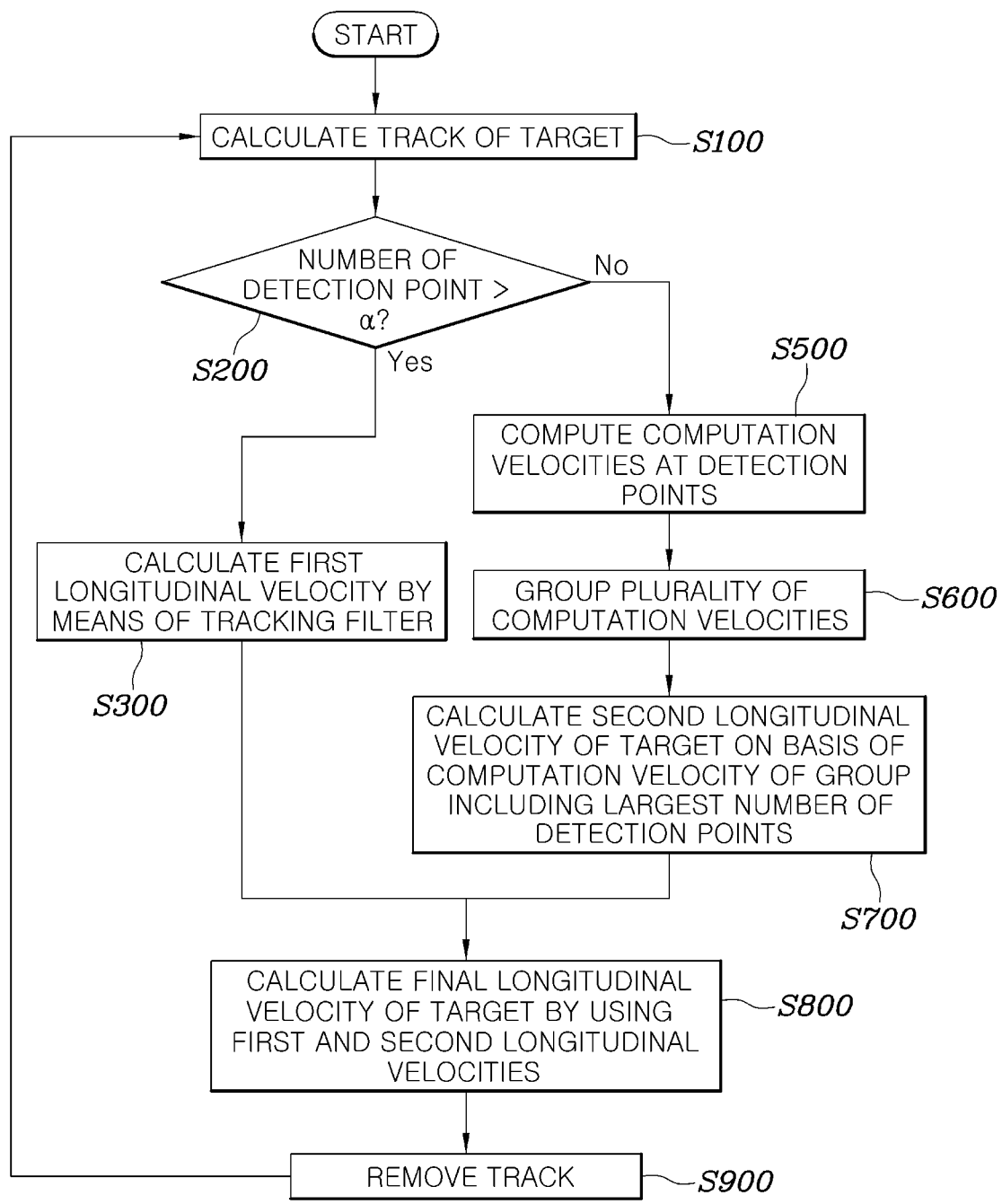
FIG. 1 is a flowchart illustrating a method of detecting a velocity of a target according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Unless otherwise defined, all terms used herein, including technical or scientific terms, have the same meaning as commonly understood by those skilled in the art to which the present disclosure pertains. The terms such as those defined in a commonly used dictionary should be interpreted as having meanings consistent with meanings in the context of related technologies and should not be interpreted as ideal or excessively formal meanings unless explicitly defined in the present specification.

Hereinafter, an embodiment of the present disclosure will be described in detail with reference to the accompanying drawings. Like reference numerals indicated in the respective drawings refer to like numbers.

The present disclosure is proposed to solve these problems and aims to accurately detect a longitudinal velocity of a target by using longitudinal and lateral velocity values calculated by grouping a plurality of Doppler velocities detected from the target by a detection sensor mounted in a vehicle on the basis of the plurality of Doppler velocities and using longitudinal and lateral velocity values calculated by a method of detecting longitudinal and lateral velocities of a target in the related art.

The method of detecting a velocity of a target according to the present disclosure calculates the first longitudinal velocity value of the target calculated by means of the tracking filter, detects the plurality of Doppler velocities of the target, computes calculation velocities on the basis of the Doppler velocities, calculates the value of the second longitudinal velocity by grouping the plurality of computation velocities, sets the weight value in respect to the value of the second longitudinal velocity, and calculates the final longitudinal velocity of the target by means of the preset computation formula on the basis of the first longitudinal velocity, the second longitudinal velocity, and the weight value. Therefore, it is possible to quickly and accurately calculate the longitudinal velocity of the target in comparison with a method of detecting a velocity of a target in the related art.

In addition, it is possible to accurately estimate the longitudinal velocity of the target by using a small number of detection processes in respect to the volume of the target, and thus a radar sensor in the related art may be used, thereby reducing costs.

In addition, the first longitudinal velocity value and the first lateral velocity value of the target calculated by means of the tracking filter are calculated, the heading angles of the target detected by the plurality of detection sensors are calculated, the plurality of Doppler velocities of the target is detected, the longitudinal and lateral calculation velocities are computed on the basis of the calculated heading angles, the second longitudinal velocity value and the second lateral velocity value are calculated by grouping the plurality of longitudinal and lateral computation velocities, the weight value in respect to the value of the second longitudinal velocity is set, the final longitudinal velocity of the target is calculated by means of the preset computation formula on the basis of the first longitudinal velocity, the second longitudinal velocity, and the weight value, and the final lateral velocity of the target is calculated by means of the preset computation formula on the basis of the first lateral velocity, the second lateral velocity, and the weight value. Therefore, it is possible to quickly and accurately calculate the longitudinal velocity and the lateral velocity of the target in comparison with a method of detecting a velocity of a target in the related art.

In addition, it is possible to accurately estimate the longitudinal velocity of the target by using a small number of detection processes in respect to the volume of the target, and thus a radar sensor in the related art may be used, thereby reducing costs.

Figure 2:
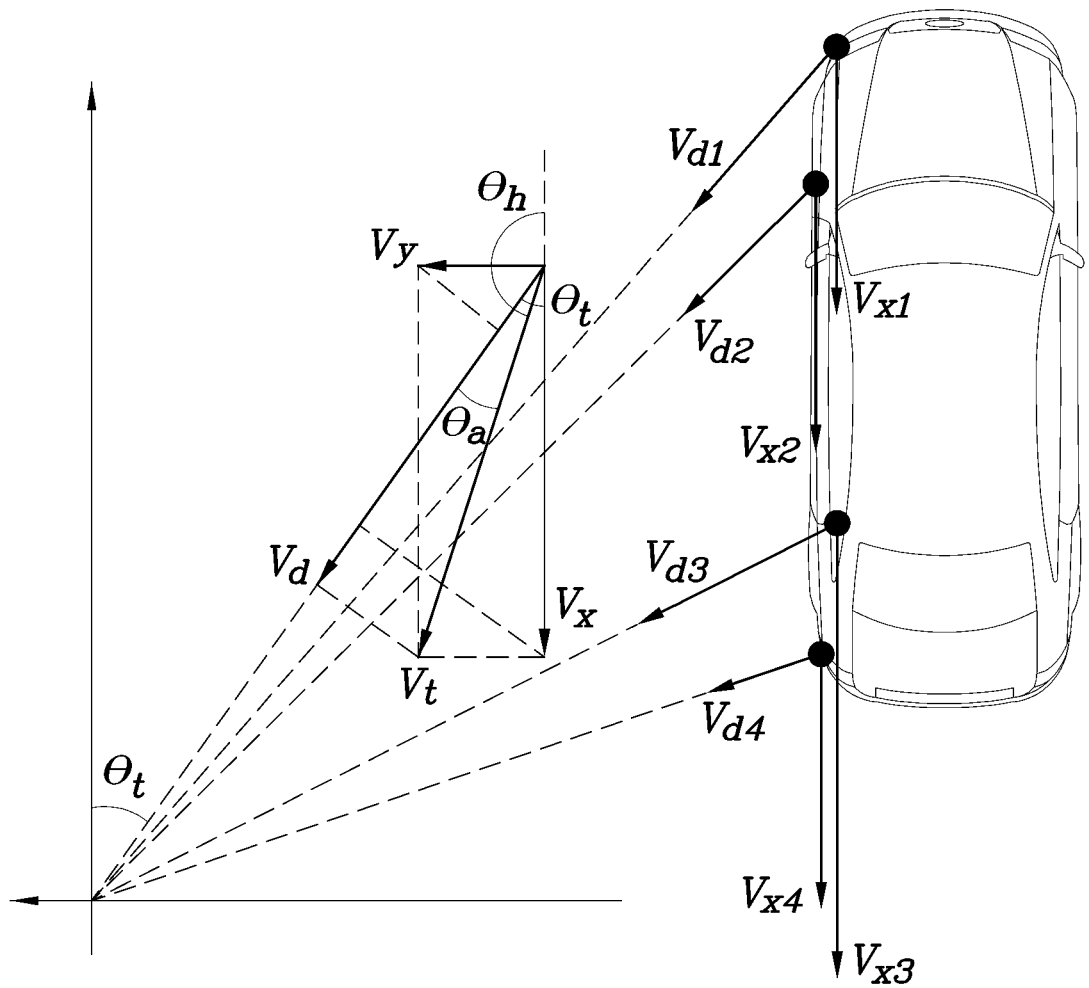
FIG. 2 is a view illustrating Doppler velocities of a plurality of external obstacles measured by a detection sensor.
Figure 3:
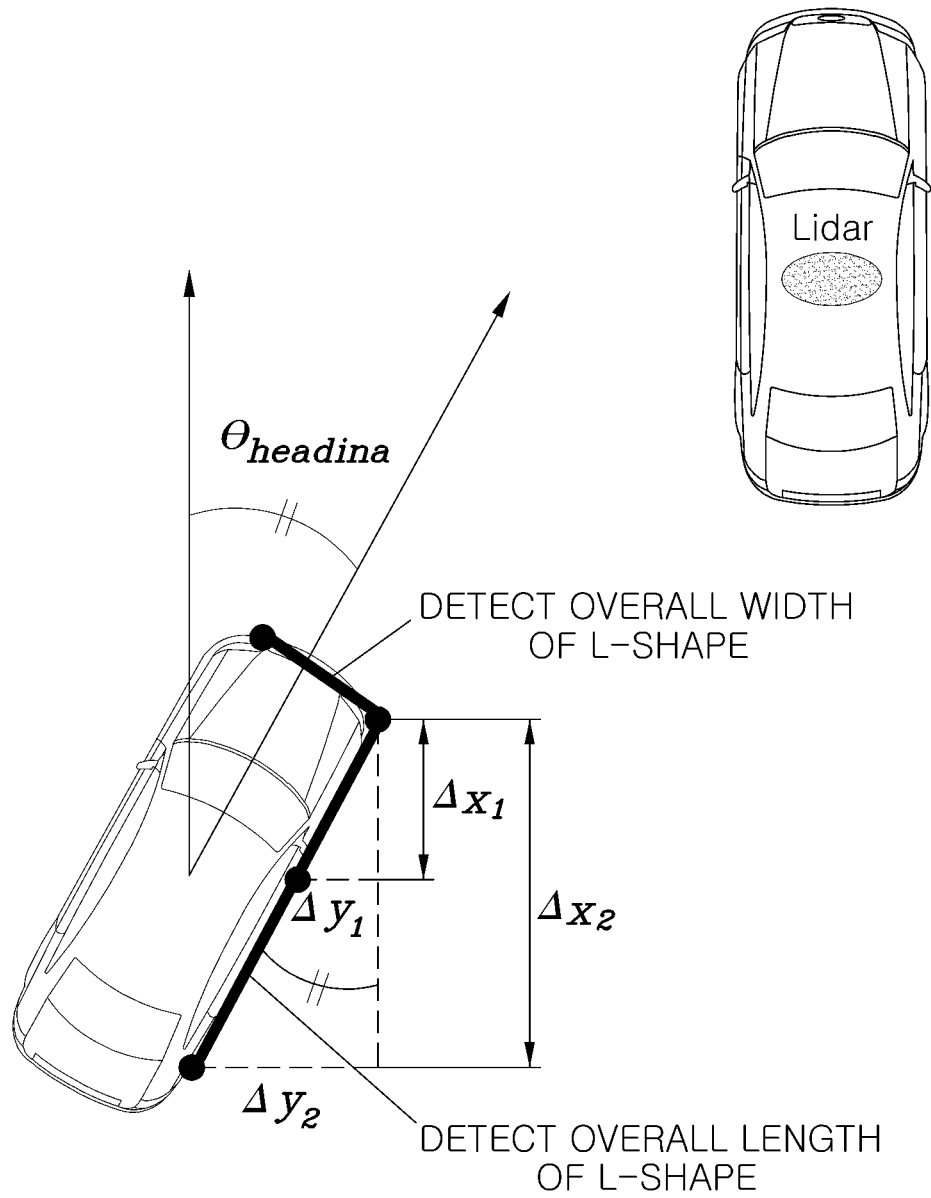
FIG. 3 is a view illustrating a process of calculating a heading angle by using a lidar sensor.
Figure 4:
FIG. 4 is a view illustrating a group made by grouping computed longitudinal or lateral computation velocities.

FIG. 1 is a flowchart illustrating a method of detecting a velocity of a target according to an embodiment of the present disclosure, FIG. 2 is a view illustrating Doppler velocities of a plurality of external obstacles measured by a detection sensor 10, FIG. 3 is a view illustrating a process of calculating a heading angle by using a lidar sensor, and FIG. 4 is a view illustrating a group made by grouping computed longitudinal or lateral computation velocities.

Embodiments of a method of detecting a velocity of a target for a vehicle according to the present disclosure will be described with reference to FIGS. 1 to 4.

The method of detecting a velocity of a target for a vehicle according to the present disclosure may detect a target by using a radar sensor disposed in a vehicle and calculate a longitudinal velocity of the target to control or assist the traveling of the vehicle.

Specifically, the method of detecting a velocity of a target for a vehicle according to the present disclosure includes: a first calculation step or operation S300 of calculating, by a tracking filter, a first longitudinal velocity at a detection point of a target detected by a detection sensor 10 of the vehicle; a computation step S500 of computing computation velocities at a plurality of detection points when the plurality of detection points is detected; a grouping step S600 of grouping the plurality of computation velocities; a second calculation step S700 of calculating a second longitudinal velocity of the target on the basis of the computation velocities of a group including the largest number of detection points; and a final calculation step S800 of calculating a final longitudinal velocity of the target by using the first and second longitudinal velocities.

In the first calculation step S300, a radar sensor disposed in the vehicle transmits electromagnetic waves to the target and recognizes detection information of the target by means of the electromagnetic waves reflected by the target and received. In this case, the first longitudinal velocity, which is the longitudinal velocity at the detection point, may be calculated by inputting the detection information on the detection point into a tracking filter which is used for a method of detecting a velocity of a target for a vehicle in the related art.

The computation step S500 is performed when the plurality of detection points is detected by the detection sensor 10 of the vehicle. The computation step S500 may be performed to compute the computation velocities by computing the detection information on the plurality of detection points by using preset computation formulas.

As illustrated in FIG. 2, the plurality of detection points may be detected on the target, and the pieces of detection information on the detection points may be different from one another.

The symbols illustrated in FIG. 2 are as follows.
$\theta_t$: target angle
$\theta_h$: heading angle of target
$V_t$: target velocity
$V_d$: doppler velocity of detection
$V_x$: longitudinal velocity of target
The preset computation formulas are as follows.

$$\theta_a = \theta_t - \theta_h$$
$$V_t = V_d / \cos(\theta_a)$$
$$V_x = V_t * \cos(\theta_h)$$
$$= V_d / \cos(\theta_a) * \cos(\theta_h)$$
$$= V_d / \cos(\theta_t - \theta_h) * \cos(\theta_h)$$

Vd represents a Doppler velocity at the detection point detected by the radar sensor. The computation step S500 may be performed to calculate a computation velocity Vx by using the computation formulas and using an angle θt between the Doppler velocity Vd and the vehicle and an angle θh between the target and the Doppler velocity Vd.

The computation velocity Vx computed in the computation step S500 may be the longitudinal velocity.

As illustrated in FIG. 4, the grouping step S600 may be performed to group similar values of the computation velocities Vx computed in the computation step S500. The grouping step S600 may be performed to define a plurality of groups.

The second calculation step S700 may be performed to calculate the second longitudinal velocity on the basis of the computation velocities of a group including the largest number of computation velocities among the groups grouped in the grouping step S600.

For example, as illustrated in FIG. 4, in the second calculation step S700, Group A includes the largest number of computation velocities among the groups grouped, and a mean value of the computation velocities of Group A may be calculated as the second longitudinal velocity.

The final calculation step S800 may be performed to compute a weight value on the basis of the number of computation velocities included in the calculated second longitudinal velocity and compute the final longitudinal velocity by summing up a value, which is made by multiplying the first longitudinal velocity by a value made by subtracting the weight value from 1, and a value which is made by multiplying the second longitudinal velocity by the weight value.

Therefore, the longitudinal velocity of the target is determined on the basis of the final longitudinal velocity made by mixing the weight value and the second longitudinal velocity calculated by computing and grouping the Doppler velocity and the first longitudinal velocity calculated by a method in the related art. Therefore, it is possible to more accurately detect the longitudinal velocity of the target in comparison with a method of detecting a longitudinal velocity of a vehicle in the related art.

The method further includes a track calculation step S100 of calculating a track of the target when the plurality of detection points of the target detected by the detection sensor 10 of the vehicle is detected within a preset range before the first calculation step S300. The first calculation step S300 may be performed to calculate the first longitudinal velocity of the target by means of the tracking filter by using the detection point detected in the track.

The detection sensor 10 of the vehicle continuously detects the target in a preset cycle. The track calculation step S100 may be performed to assuredly calculate the position information of the target by calculating the track on the basis of the positions of the plurality of detection points. When the track is defined for the target, the first calculation step S300 may be performed to calculate the first longitudinal velocity of the target by inputting only the detection information on the detection point, which is detected in the track, into the tracking filter.

The computation step S500 may be performed to calculate the computation velocities at the plurality of detection points detected in the track.

The computation step S500 may also be performed to compute the plurality of detection points, which is detected in the track, by means of the preset computation formulas, thereby computing the velocity at the detection point detected at the accurate position of the target.

The computation step S500 may be performed to compute the computation velocity of the target by means of the preset computation formula on the basis of the Doppler velocity at the target point.

The detection sensor 10 of the vehicle may be the radar sensor. The computation step S500 may be performed to compute the longitudinal computation velocity at the detection point by means of the preset computation formula on the basis of the Doppler velocity detected by the radar sensor.

In the grouping step S600, the plurality of groups in which the computation velocities are defined within the preset range may be defined on the basis of the plurality of computation velocities computed in the computation step S500. In the second calculation step S700, the second longitudinal velocity may be calculated on the basis of a mean value of the computation velocities included in the group including the largest number of computation velocities among the plurality of groups.

In the grouping step S600, the plurality of computation velocities computed in the computation step S500 within the preset range may be grouped. In the second calculation step S700, the second longitudinal velocity may be calculated on the basis of the mean value of the computation velocity values included in the group including the largest number of calculated computation velocities among the groups grouped in the grouping step S600.

Therefore, it is possible to improve the accuracy of the second longitudinal velocity.

The method further includes a determination step S200 of determining the number of detection points. The computation step S500 may be performed when it is determined that the number of detection points is equal to or larger than a preset number in the determination step S200. The first calculation step S300 may be performed when it is determined that the number of detection points is smaller than the preset number in the determination step S200.

The determination step S200 is performed before the first calculation step S300 and the computation step S500. The determination step S200 is performed to determine the number of detection points detected in the track. When the number of detected detection points is equal to or larger than the preset number, the computation step S500 may be performed to calculate the second longitudinal velocity. When the number of detected detection points is equal to or smaller than the preset number, the first calculation step S300 may be performed to calculate the first longitudinal velocity.

In the final calculation step S800, the weight value is set as a value made by dividing the number of detection points used in the second calculation step S700 by the total number of detection points. The final longitudinal velocity may be calculated by using the weight value and the first and second longitudinal velocities.

The weight value may be computed as a value made by dividing the number of detection points used in the second calculation step S700 by the total number of detection points detected in the track. The weight value indicates reliability of the second longitudinal velocity. The reliability of the second longitudinal velocity is increased as the weight value approaches 1, and the reliability of the second longitudinal velocity is decreased as the weight value approaches 0.

Therefore, in the final calculation step S800, the final longitudinal velocity may be computed by means of the preset computation formula on the basis of the first and second longitudinal velocities and the weight value.

Weight Value:

$$\alpha = \frac{m}{n}$$

n: number of detection points used to compute second longitudinal velocity
m: total number of detection points detected in track
The preset computation formula is as follows.

$$V_{x,out} = (1-\alpha) \cdot V_{x,trk} + \alpha \cdot V_{x,VDC}$$

Vx_trt: first longitudinal velocity, Vx_vdc: second longitudinal velocity

The final calculation step S800 may be performed to calculate the final longitudinal velocity by summing up a value, which is made by multiplying the first longitudinal velocity by a value made by subtracting the weight value from 1, and a value which is made by multiplying the second longitudinal velocity by the weight value.

As shown in the computation formula, the final longitudinal velocity may be calculated by summing up the value, which is made by multiplying the first longitudinal velocity by the value made by subtracting the weight value from 1, and the value which is made by multiplying the second longitudinal velocity by the weight value.

Therefore, it is possible to calculate the final longitudinal velocity by increasing the proportions of the first and second longitudinal velocities depending on the reliability of the second longitudinal velocity.

The method may further include, after the final calculation step S800, a track removing step S900 of removing the track calculated in the track calculation step S100. After the track removing step S900, a track calculation step S100 may be performed to create a new track.

When the final longitudinal velocity is calculated, the track removing step S900 of removing the created track may be performed. When the track is removed, the track creating step may be performed to a new track.

Therefore, it is possible to consistently detect the target.

Figure 5:
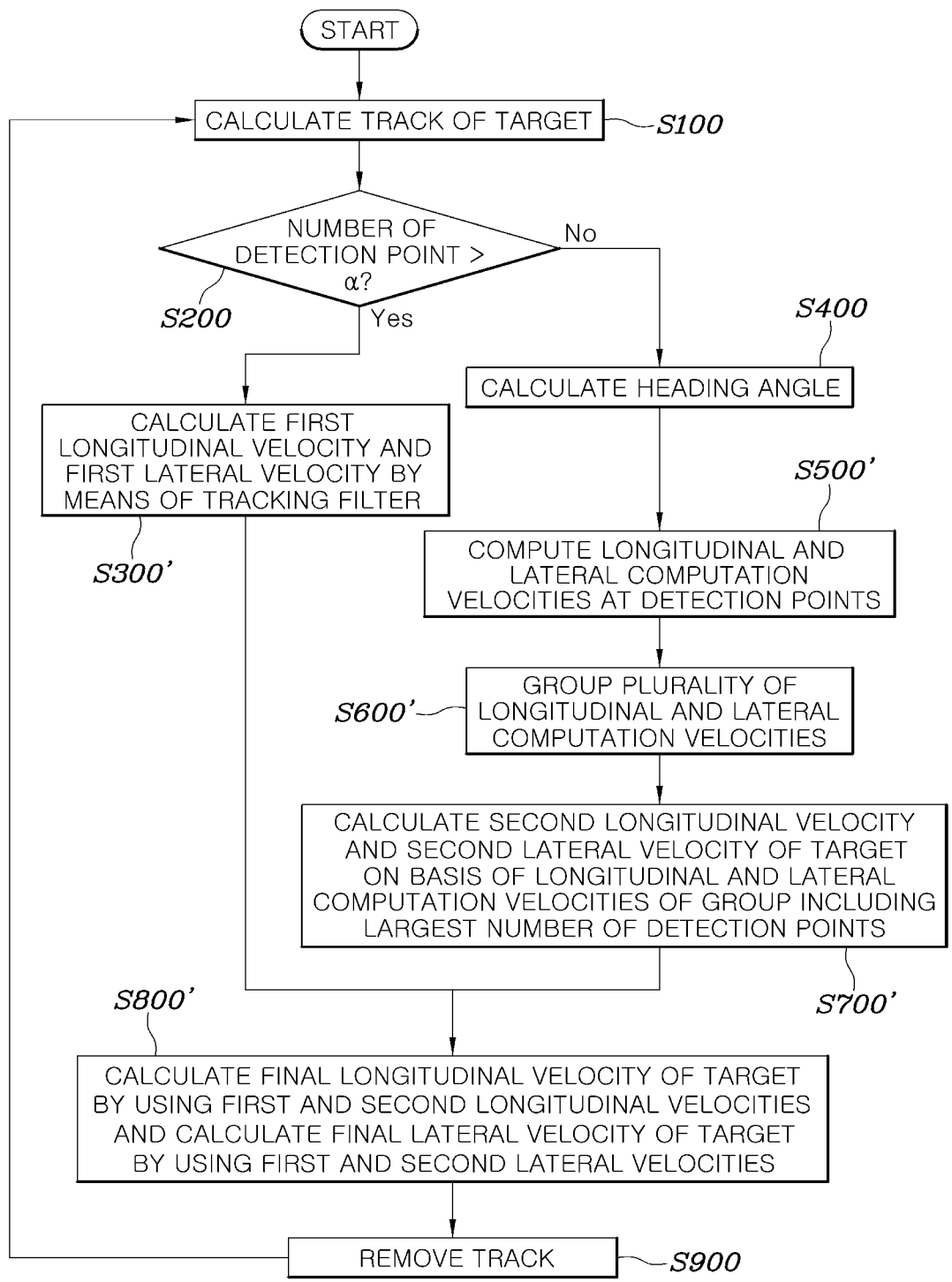
FIG. 5 is a flowchart illustrating a method of detecting a velocity of a target according to another embodiment.

FIG. 5 is a flowchart illustrating a method of detecting a velocity of a target according to another embodiment of the present disclosure.

Another embodiment of the method of detecting a velocity of a target according to the present disclosure will be described with reference to FIG. 5.

The method of detecting a velocity of a target according to the present disclosure includes: a first calculation step S300' of calculating, by a tracking filter, a first longitudinal velocity and a first lateral velocity at a detection point of a target detected by a sensor of the vehicle; a heading angle calculation step S400 of calculating, by the tracking filter and detection information on the detection point, heading angles at a plurality of detection points when the plurality of detection points is detected; a computation step S500' of computing longitudinal and lateral computation velocities at the detection points on the basis of the calculated heading angles; a grouping step S600' of grouping the plurality of longitudinal and lateral computation velocities; a second calculation step S700' of calculating a second longitudinal velocity and a second lateral velocity of the target on the basis of the longitudinal and lateral computation velocities of a group including the largest number of detection points; and a final calculation step S800' of calculating a final velocity of the target by using the first and second longitudinal velocities.

In the first calculation step S300', a radar sensor disposed in the vehicle transmits electromagnetic waves to the target and recognizes detection information of the target by means of the electromagnetic waves reflected by the target and received. In this case, the first longitudinal velocity, which is the longitudinal velocity at the detection point, and the first lateral velocity may be calculated by inputting the detection information on the detection point into the tracking filter which is used for a method of detecting a velocity of a target for a vehicle in the related art.

The computation step S500' is performed when the plurality of detection points is detected by the detection sensor 10 of the vehicle. The computation step S500' may be performed to compute the computation velocities by computing the detection information on the plurality of detection points by using preset computation formulas.

As illustrated in FIG. 2, the plurality of detection points may be detected on the target, and the pieces of detection information on the detection points may be different from one another.

The symbols illustrated in FIG. 2 are as follows.

$\theta_t$: target angle

1$\theta_h$: heading angle of target $V_t$: target velocity $V_d$: doppler velocity of detection $V_x$: longitudinal velocity of target The preset computation formulas are as follows.

$$\theta_a = \theta_t - \theta_h$$

$$V_t = V_d / \cos(\theta_a)$$

$$V_x = V_t * \cos(\theta_h)$$

$$= V_d / \cos(\theta_a) * \cos(\theta_h)$$

$$= V_d / \cos(\theta_t - \theta_h) * \cos(\theta_h)$$

$$V_y = V_t * \sin\theta_h = \frac{V_d}{\cos\theta_a} * \sin\theta_h = \frac{V_d}{\cos(\theta_t - \theta_t)} * \sin\theta_h$$

Vd represents a Doppler velocity at the detection point detected by the radar sensor. The computation step S500' may be performed to calculate a longitudinal computation velocity Vx and a lateral computation velocity Vy by using the computation formulas and using a heading angle θh and an angle θt between the Doppler velocity Vd and the vehicle.

The heading angle θh may be computed as follows.

In the heading angle calculation step, the heading angle between the vehicle and the target may be calculated by the radar sensor, the lidar sensor, or the camera sensor disposed in the vehicle.

FIG. 3 is a view illustrating a process of calculating the heading angle of the target by using the lidar sensor mounted in the vehicle, and a computation formula related to the process is as follows.

$$\theta_{Lidar\_heading} = \omega_1 \cdot \tan^{-1}\frac{\Delta y_1}{\Delta x_1} + \omega_2 \cdot \tan^{-1}\frac{\Delta y_2}{\Delta x_2} + \ldots + \omega_k \cdot \tan^{-1}\frac{\Delta y_k}{\Delta x_k}$$

An overall width and an overall length of the target are detected, and the heading angle may be calculated on the basis of the overall width and the overall length of the target.

In addition, the camera sensor disposed in the vehicle may capture an image of the target, and the heading angle may be calculated by using the image information.

The heading angle of the target may be calculated by means of the above-mentioned sensor fusion, and the heading angle may be finally calculated on the basis of the heading angle, which is calculated by means of the sensor fusion, and the detection information detected by the radar sensor in the related art.

$$\theta_{Radar\_heading} = \tan^{-1}\frac{\Delta V_y}{\Delta V_x}$$

The computation formula indicates the heading angle calculated on the basis of the detection information detected by the radar sensor.

$$\theta_{heading} = \alpha \cdot \theta_{Lidar_{heading}} + \beta \cdot \theta_{Radar\_heading}$$

The final heading angle may be calculated by providing weight values depending on detection abilities of the sensors.

As illustrated in FIG. 4, the grouping step S600' may be performed to group similar values of the longitudinal computation velocities Vx and the lateral computation velocities Vy computed in the computation step S500'. The grouping step S600' may be performed to define a plurality of groups.

The second calculation step S700' may be performed to the second longitudinal velocity and the second lateral velocity on the basis of the longitudinal and lateral computation velocities of the group including the largest number of longitudinal and lateral computation velocities among the groups grouped in the grouping step S600'.

For example, as illustrated in FIG. 4, in the second calculation step S700', Group A includes the largest number of computation velocities among the groups grouped, and a mean value of the computation velocities of Group A may be calculated as the second longitudinal velocity or the second lateral velocity.

In the final calculation step S800', a final longitudinal velocity and a final lateral velocity may be computed by providing a weight value to the calculated second longitudinal velocity or the calculated second lateral velocity, providing a weight value, for example, 1, to the first longitudinal velocity or the first lateral velocity, and summing up the result values.

Therefore, the velocity of the target is determined on the basis of the final longitudinal velocity and the final lateral velocity made by mixing the weight value and the second longitudinal velocity and the second lateral velocity calculated by computing and grouping the Doppler velocity and the first longitudinal velocity and the first lateral velocity calculated by a method in the related art. Therefore, since the direction of the target is detected in the heading angle calculation step S400, it is possible to more accurately detect the velocity of the target in comparison with a method of detecting a longitudinal velocity of a vehicle in the related art.

The method further includes, before the first calculation step S300', a track calculation step S100 of calculating a track of the target when the plurality of detection points of the target detected by the sensor of the vehicle is detected within a preset range.

The detection sensor 10 of the vehicle continuously detects the target in a preset cycle. The track calculation step S100 may be performed to assuredly calculate the position information of the target by calculating the track on the basis of the positions of the plurality of detection points. When the track is defined for the target, the first calculation step S300' may be performed to calculate the first longitudinal velocity and the first lateral velocity by inputting only the detection information on the detection point, which is detected in the track, into the tracking filter.

In addition, the computation step S500' may be performed to calculate the longitudinal and lateral computation velocities at the plurality of detection points detected in the track.

It is possible to set a position of the target by means of the track and more accurately calculate the velocity of the target in the computation step S500' and the grouping step S600'.

The heading angle calculation step S400 may be performed to calculate the heading angle of the target on the basis of the detection information of the target detected by the lidar sensor, the camera sensor, and the ultrasonic sensor disposed in the vehicle and the detection information of the target detected by the radar sensor.

The heading angle calculation step S400 may be performed to calculate the heading angle of the target by using the lidar sensor, the camera sensor, and the ultrasonic sensor mounted in the vehicle and configured to detect the target, and calculate the heading angle by using the tracking filter on the basis of the detection information of the target detected by the radar sensor, thereby calculating the final heading angle by mixing the pieces of information on the heading angles.

The heading angle of the target may be calculated by providing weight values to the detection information on the basis of detection levels of the lidar sensor, the camera sensor, and the ultrasonic sensor and a detection level of the radar sensor.

The final heading angle may be calculated by providing the weight value to the angle value of the heading angle detected by the lidar sensor, the camera sensor, and the ultrasonic sensor on the basis of the detection levels of the lidar sensor, the camera sensor, and the ultrasonic sensor, providing the weight value to the angle value of the heading angle calculated by means of the tracking filter on the basis of the detection information detected by the radar sensor, and summing up the angle values of the heading angles.

Therefore, it is possible to mix the heading angles calculated by the sensors, thereby accurately calculating the heading angle of the target.

The computation step S500' may be performed to compute the computation velocity of the target by means of the preset computation formula on the basis of the Doppler velocity at the target point.

The detection sensor 10 of the vehicle may be the radar sensor. The computation step S500' may be performed to compute the longitudinal computation velocity at the detection point by means of the preset computation formula on the basis of the Doppler velocity detected by the radar sensor.

In the grouping step S600', the plurality of groups in which longitudinal and lateral computation velocities are defined within the preset range may be defined on the basis of the plurality of longitudinal and lateral computation velocities computed in the computation step S500'. In the second calculation step S700', the second longitudinal velocity and the second lateral velocity may be calculated on the basis of the mean value of the computation velocities included in the group including the largest number of computation velocities among the plurality of groups.

In the grouping step S600', the plurality of longitudinal or lateral computation velocities computed in the computation step S500' within the preset range may be grouped. In the second calculation step S700', the second longitudinal velocity or the second lateral velocity may be calculated on the basis of the mean value of the computation velocity values included in the group including the largest number of calculated longitudinal or lateral computation velocities grouped in the grouping step S600'.

The method further includes a determination step S200 of determining the number of detection points. The computation step S500' may be performed when it is determined that the number of detection points is equal to or larger than a preset number in the determination step S200. The first calculation step S300' may be performed when it is determined that the number of detection points is smaller than the preset number in the determination step S200.

When it is determined that the number of detection points detected in the track is smaller than the preset number in the determination step S200, the first calculation step S300' may be performed to calculate the first longitudinal velocity and the first lateral velocity. When the number of detection points detected in the track is equal to or larger than the preset number, the computation step S500' may be performed, and the second calculation step S700' may be performed to calculate the second longitudinal velocity and the second lateral velocity.

In the final calculation step S800', the weight value is set as a value made by dividing the number of detection points used in the second calculation step S700' by the total number of detection points. The final longitudinal velocity may be calculated by using the weight value and the first and second longitudinal velocities, and the final lateral velocity may be calculated by using the weight value and the first and second lateral velocities.

In the final calculation step S800', the weight value may be calculated on the basis of the number of detection points used for the process of calculating the second longitudinal velocity and the second lateral velocity. The weight value may be provided to the second longitudinal velocity and the second lateral velocity, and a value made by subtracting the weight value from 1 may be provided to the first longitudinal velocity and the first lateral velocity. Thereafter, the final longitudinal velocity may be calculated by summing up the first and second longitudinal velocities to which the weight value is provided, and the final lateral velocity may be calculated by summing up the first and second lateral velocities to which the weight value is provided.

The weight values, which are provided to the first longitudinal velocity and the first lateral velocity, will be described below.

The final calculation step S800' may be performed to calculate the final longitudinal velocity by summing up a value, which is made by multiplying the first longitudinal velocity by a value made by subtracting the weight value from 1, and a value made by multiplying the second longitudinal velocity by the weight value, and calculate the final lateral velocity by summing up a value, which is made by multiplying the first lateral velocity by a value made by subtracting the weight value from 1, and a value made by multiplying the second lateral velocity by the weight value.

The weight value, which is multiplied by the second longitudinal velocity and the second lateral velocity, may be set as a value made by dividing the number of computation velocities, which is used to compute the second longitudinal velocities and the second longitudinal velocities, by the total number of detection points detected in the track. The weight value, which is multiplied by the first longitudinal velocity and the first lateral velocity, may be set as a value made by subtracting the weight value, which is multiplied by the second longitudinal velocity and the second lateral velocity, from 1. The proportion of the final longitudinal velocity and the proportion of the final lateral velocity may be set depending on the reliability of the second longitudinal velocity and the reliability of the second lateral velocity.

A value of the final longitudinal velocity Vx_out and a value of the final lateral velocity Vy_out may be computed by means of the following computation formula.

Weight Value:

$$\alpha = \frac{m}{n}$$

n: number of detection points used to compute second longitudinal velocity
m: total number of detection points detected in track
The preset computation formula is as follows.

$$V_{x,out} = (1-\alpha) \cdot V_{x,trk} + \alpha \cdot V_{x,VDC}$$

Vx_trt: first longitudinal velocity, Vx_vdc: second longitudinal velocity $$V_{y,out} = (1-\alpha) \cdot V_{y,trk} + \alpha \cdot V_{y,VDC}$$

Vy_trt: first longitudinal velocity, Vx_vdc: second longitudinal velocity

The method may further include, after the final calculation step S800', a track removing step S900 of removing the track calculated in the track calculation step S100. After the track removing step S900, the track calculation step S100 may be performed to create a new track.

After the final longitudinal velocity and the final lateral velocity of the target are calculated in the final calculation step S800', the track removing step S900 may be performed to remove the track and detect a new target.

A track calculation unit 20 (also referred to as track calculator), a first calculation unit 30 (also referred to as first calculator), a heading angle calculation unit 40 (heading angle calculator), a computation unit 50 (also referred to computator), a second calculation unit 60 (also referred to as second calculator), and a final calculation unit 70 (also referred to as final calculator) according to the embodiment of the present disclosure may be implemented by a non-volatile memory (not illustrated) configured to store algorithm for controlling operations of various constituent elements in a vehicle or store data related to software commands for executing the algorithm, and by a processor (not illustrated) configured to perform the following operations by using the data stored in the corresponding memory. In this case, the memory and the processor may be implemented as separate chips. Alternatively, the memory and the processor may be implemented as a single chip in which the memory and the processor are integrated. The processor may be configured in the form of one or more processors.

Figure 6:
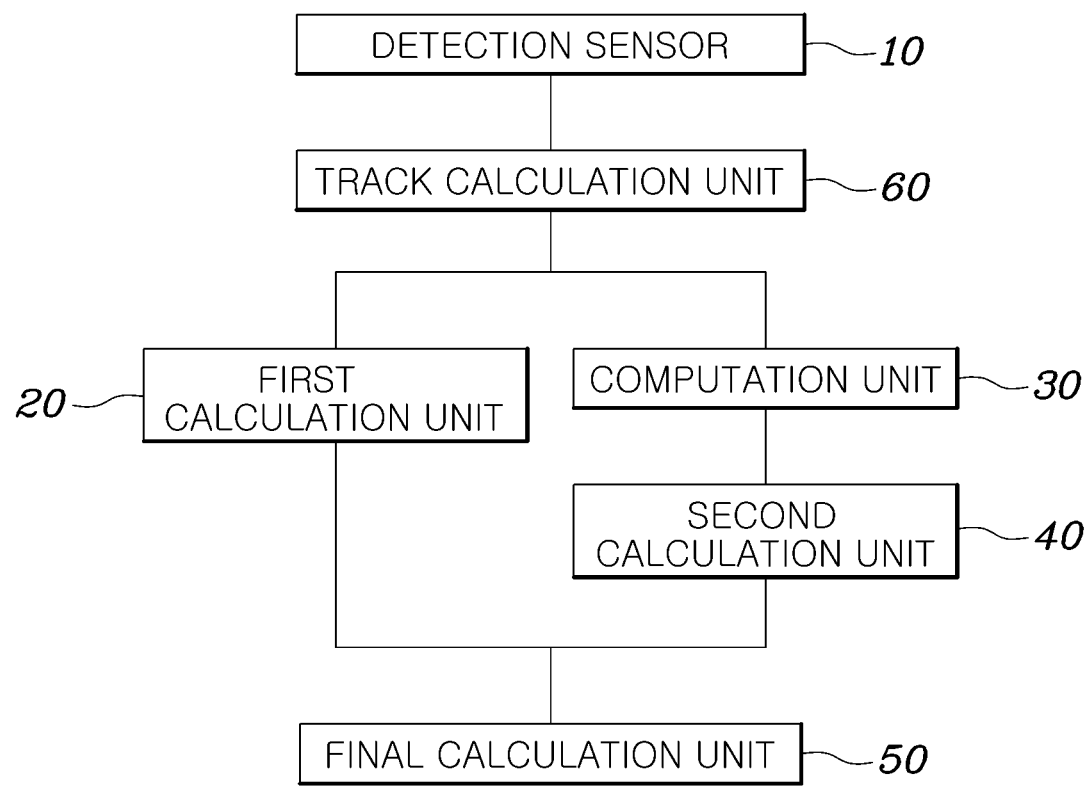
FIG. 6 is a configuration view illustrating a system for detecting a velocity of a target according to the embodiment.

FIG. 6 is a configuration view illustrating a system for detecting a velocity of a target according to the embodiment of the present disclosure.

An embodiment of a system for detecting a velocity of a target according to the present disclosure will be described with reference to FIG. 6.

The system for detecting a velocity of a target according to the present disclosure includes: the first calculation unit 30 configured to calculate, by using the tracking filter, the first longitudinal velocity and the first lateral velocity at the detection point of the target detected by the detection sensor 10 of the vehicle; the heading angle calculation unit 40 configured to calculate, by using the tracking filter and the detection information on the detection point, the heading angles at the plurality of detection points when the plurality of detection points is detected; the computation unit 50 configured to compute the longitudinal and lateral computation velocities at the detection points on the basis of the heading angles calculated in the heading angle calculation unit 40; the second calculation unit 60 configured to group the plurality of longitudinal and lateral computation velocities and calculate the second longitudinal velocity and the second lateral velocity of the target on the basis of the longitudinal and lateral computation velocities of the group including the largest number of detection points; and the final calculation unit 70 configured to calculate the final longitudinal velocity of the target by using the first and second longitudinal velocities and calculate the final lateral velocity of the target by using the first and second lateral velocities.

The system further includes the track calculation unit 20 configured to calculate the track of the target when the plurality of detection points of the target detected by the detection sensor 10 of the vehicle is detected within the preset range. The first calculation unit 30 may calculate the first longitudinal velocity and the first lateral velocity of the target by means of the tracking filter by using the detection point detected in the track.

The computation unit 50 may calculate the longitudinal and lateral computation velocities at the plurality of detection points detected in the track calculated in the track calculation unit 20.

The computation unit 50 may compute the longitudinal and lateral computation velocities of the target by means of the preset computation formula on the basis of the Doppler velocity at the target point detected by the laser sensor.

The system further includes a determination unit configured to determine the number of detection points of the target detected by the detection sensor 10 of the vehicle. The computation unit 50 may compute the longitudinal and lateral computation velocities at the detection points when the determination unit determines that the number of detection points is equal to or larger than the preset number. The first calculation unit 30 may calculate the first longitudinal velocity and the first lateral velocity when the determination unit determines that the number of detection points is smaller than the preset number.

The final calculation unit 70 may set the weight value on the basis of the number of detection points computed by the second calculation unit 60 and the total number of detection points, calculate the final longitudinal velocity by using the weight value and the first and second longitudinal velocities, and calculate the final lateral velocity by using the weight value and the first and second lateral velocities.

When the final velocity is calculated by the final calculation unit 70, the track calculation unit 20 may remove the track and create a new track.

The detection sensor, track calculation unit, first calculation unit, computation unit, second computation unit, heading angle calculation unit, computation unit, and final calculation unit in FIGS. 1-6 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of detecting a velocity of a target for a vehicle, the method comprising:
    detecting the target using a detection sensor;
    calculating, by a tracking filter in a first calculation operation, a first longitudinal velocity at a detection point of the target detected by the detection sensor;
    computing, in a computation operation, longitudinal computation velocities at a plurality of detection points when the plurality of detection points is detected;
    grouping, in a grouping operation, the longitudinal computation velocities;
    calculating, in a second calculation operation, a second longitudinal velocity of the target based on the longitudinal computation velocities of a group of the grouping including a largest number of detection points;
    calculating, in a final calculation operation, a final longitudinal velocity of the target by using the first and second longitudinal velocities; and
    controlling the vehicle based on the calculated final longitudinal velocity of the target.

2. The method of claim 1, further comprising:
    calculating, by the tracking filter and detection information on the detection points in a heading angle calculation operation, heading angles at the plurality of detection points when the plurality of detection points is detected,
    wherein the first calculation operation is performed to further calculate, by the tracking filter, a first lateral velocity at the detection point of the target detected by the detection sensor,
    the computation operation is performed to compute longitudinal and lateral computation velocities at the detection points based on the calculated heading angles,
    the grouping operation is performed to group the plurality of longitudinal and lateral computation velocities,
    the second calculation operation is performed to calculate the second longitudinal velocity and a second lateral velocity of the target based on the longitudinal and lateral computation velocities of the group including the largest number of detection points, and
    the final calculation operation is performed to calculate a final velocity of the target by using the first and second longitudinal velocities.

3. The method of claim 2, further comprising:
    calculating, in a track calculation operation, a track of the target when the plurality of detection points of the target detected by the detection sensor is detected within a preset range before the first calculation operation,
    wherein the first calculation operation is performed to calculate the first longitudinal velocity and the first lateral velocity of the target using the tracking filter by using the detection point detected in the track.

4. The method of claim 2, wherein the computation operation is performed to calculate the longitudinal and lateral computation velocities at the plurality of detection points detected in the track.

5. The method of claim 2, wherein the computation operation is performed to compute the longitudinal computation velocity and a lateral computation velocity of the target using a preset computation formula based on a Doppler velocity at a target point.

6. The method of claim 2, wherein the grouping operation is performed to define a plurality of groups in which the longitudinal and lateral computation velocities are defined within a preset range based on the plurality of longitudinal and lateral computation velocities computed in the computation operation, and
    the second calculation operation is performed to calculate the second longitudinal velocity and the second lateral velocity based on a mean value of the computation velocities included in the group including the largest number of computation velocities among the plurality of groups.

7. The method of claim 2, wherein the heading angle calculation operation is performed to calculate the heading angle of the target based on detection information of the target detected by any one or any combination of any two or more of a lidar sensor, a camera sensor, and an ultrasonic sensor disposed in the vehicle and detection information of the target detected by a radar sensor.

8. The method of claim 7, wherein the heading angle of the target is calculated by providing a weight value to the detection information based on detection levels of any one or any combination of any two or more of the lidar sensor, the camera sensor, and the ultrasonic sensor and a detection level of the radar sensor.

9. The method of claim 2, wherein the final calculation operation is performed to set a weight value as a value determined by dividing the number of detection points used in the second calculation operation by the total number of detection points, calculate the final longitudinal velocity by using the weight value and the first and second longitudinal velocities, and calculate the final lateral velocity by using the weight value and the first and second lateral velocities.

10. The method of claim 9, wherein the final calculation operation is performed to calculate the final longitudinal velocity by summing up
    a first longitudinal value determined by multiplying the first longitudinal velocity by a value determined by subtracting the weight value from 1,
    a second longitudinal value determined by multiplying the second longitudinal velocity by the weight value and calculating the final lateral velocity by summing up
    a first lateral value determined by multiplying the first lateral velocity by the value determined by subtracting the weight value from 1, and
    a second lateral value determined by multiplying the second lateral velocity by the weight value.

11. The method of claim 1, further comprising:
determining the number of detection points in a determination operation,
wherein the computation operation is performed when it is determined that the number of detection points is equal to or larger than a preset number in the determination operation, and
the first calculation operation is performed when it is determined that the number of detection points is smaller than the preset number in the determination operation.

12. The method of claim 1, wherein the final calculation operation is performed to set a weight value as a value determined by dividing the number of detection points used in the second calculation operation by the total number of detection points and calculate the final longitudinal velocity by using the weight value and the first and second longitudinal velocities.

13. The method of claim 12, wherein the final calculation operation is performed to calculate the final longitudinal velocity by summing up a first longitudinal value determined by multiplying the first longitudinal velocity by a value determined by subtracting the weight value from 1, and
a second longitudinal value determined by multiplying the second longitudinal velocity by the weight value.

14. A system for detecting a velocity of a target for a vehicle, the system comprising:
a detection sensor configured to detect the target;
a first calculator configured to calculate, by a tracking filter, a first longitudinal velocity and a first lateral velocity at a detection point of the target detected by the detection sensor;
a heading angle calculator configured to calculate, by the tracking filter and detection information on the detection point, heading angles at a plurality of detection points when the plurality of detection points is detected;
a computator configured to compute longitudinal and lateral computation velocities at the detection points based on the heading angles calculated by the heading angle calculator;
a second calculator configured to group the plurality of longitudinal and lateral computation velocities and calculate a second longitudinal velocity and a second lateral velocity of the target based on the longitudinal and lateral computation velocities of a group including a largest number of detection points;
a final calculator configured to calculate a final longitudinal velocity of the target by using the first and second longitudinal velocities and calculate a final lateral velocity of the target by using the first and second lateral velocities; and
a controller configured to control the vehicle based on the calculated final longitudinal velocity of the target.

15. The system of claim 14, further comprising:
a track calculator configured to calculate a track of the target when the plurality of detection points of the target detected by the detection sensor is detected within a preset range,
wherein the first calculator is further configured to calculate the first longitudinal velocity and the first lateral velocity of the target using the tracking filter by using the detection point detected in the track.

16. The system of claim 15, wherein the computator is further configured to calculate the computation velocities at the plurality of detection points detected in the track calculated by the track calculator.

17. The system of claim 14, wherein the computator is further configured to calculate the longitudinal and lateral computation velocities at the plurality of detection points detected in the track calculated by the track calculator.

18. The system of claim 14, further comprising:
a determiner configured to determine the number of detection points of the target detected by the detection sensor,
wherein the computator is further configured to compute the longitudinal and lateral computation velocities at the detection points when the determiner determines that the number of detection points is equal to or larger than a preset number, and
the first calculator is further configured to calculate the first longitudinal velocity and the first lateral velocity when the determiner determines that the number of detection points is smaller than the preset number.

19. The system of claim 14, wherein the final calculator is further configured to calculate a weight value based on the number of detection points computed by the second calculator and the total number of detection points,
calculate the final longitudinal velocity by using the weight value and the first and second longitudinal velocities, and
calculate the final lateral velocity by using the weight value and the first and second lateral velocities.

20. A system for detecting a velocity of a target for a vehicle, the system comprising:
a detection sensor configured to detect a target; and
one or more microprocessors, wherein the one of more microprocessors are collectively configured to:
calculate a first longitudinal velocity and a first lateral velocity at a detection point of the target detected by the detection sensor;
calculate heading angles at a plurality of detection points when the plurality of detection points is detected;
compute longitudinal and lateral computation velocities at the detection points based on the calculated heading angles;
group the plurality of longitudinal and lateral computation velocities and calculate a second longitudinal velocity and a second lateral velocity of the target based on the longitudinal and lateral computation velocities of a group including a largest number of detection points;
calculate a final longitudinal velocity of the target by using the first and second longitudinal velocities and calculate a final lateral velocity of the target by using the first and second lateral velocities; and
control the vehicle based on the calculated final longitudinal velocity of the target.

* * * * *